(12) United States Patent
Clarke

(10) Patent No.: US 7,156,595 B2
(45) Date of Patent: Jan. 2, 2007

(54) LOAD INDICATING FASTENER INSERT

(76) Inventor: Ronald C. Clarke, 328 W. Georgia, Phoenix, AZ (US) 85013

( * ) Notice: Subject to any disclaimer, the term of this patent is extended or adjusted under 35 U.S.C. 154(b) by 172 days.

(21) Appl. No.: 10/401,439

(22) Filed: Mar. 27, 2003

(65) Prior Publication Data

US 2003/0190210 A1 Oct. 9, 2003

Related U.S. Application Data

(63) Continuation-in-part of application No. 09/992,871, filed on Nov. 16, 2001, now abandoned.

(51) Int. Cl.
*F16B 31/02* (2006.01)
(52) U.S. Cl. ............... 411/10; 411/14; 411/155; 411/544
(58) Field of Classification Search ........... 411/8–14, 411/531, 544, 155, 915–917; 73/761; 116/212, 116/284
See application file for complete search history.

(56) References Cited

U.S. PATENT DOCUMENTS

| | | | | |
|---|---|---|---|---|
| 1,019,097 | A * | 3/1912 | Spencer | 411/129 |
| 3,060,731 | A * | 10/1962 | Adise | 73/862.636 |
| 3,169,440 | A * | 2/1965 | Taylor | 411/11 |
| 3,329,058 | A * | 7/1967 | Cumming | 411/11 |
| 4,131,050 | A * | 12/1978 | Holmes | 411/10 |
| 4,149,446 | A * | 4/1979 | Spengler et al. | 411/11 |
| 4,164,164 | A * | 8/1979 | Trungold | 411/10 |
| 4,293,257 | A | 10/1981 | Peterson | |
| 4,303,001 | A * | 12/1981 | Trungold | 411/10 |
| 4,773,272 | A * | 9/1988 | Trungold | 73/761 |
| 5,385,054 | A * | 1/1995 | Kramer | 73/761 |
| 5,542,798 | A * | 8/1996 | Rawdon et al. | 410/100 |
| 5,584,627 | A * | 12/1996 | Ceney et al. | 411/14 |
| 5,668,323 | A * | 9/1997 | Waxman | 73/761 |
| 5,804,737 | A * | 9/1998 | Johnson et al. | 73/761 |
| 6,116,094 | A * | 9/2000 | Andersson | 73/761 |
| 6,204,771 | B1 * | 3/2001 | Ceney | 340/665 |
| 6,244,804 | B1 * | 6/2001 | Hodge | 411/8 |
| 6,250,863 | B1 * | 6/2001 | Kamentser et al. | 411/10 |
| 6,527,037 | B1 * | 3/2003 | Daus et al. | 160/315 |
| 2003/0095848 | A1 | 5/2003 | Clarke | |

FOREIGN PATENT DOCUMENTS

| | | |
|---|---|---|
| GB | 1 315 702 | 5/1973 |
| GB | 2179459 | * 3/1987 |
| GB | 2265954 | * 10/1993 |
| WO | WO 03 050495 | 6/2003 |

OTHER PUBLICATIONS

PCT International Search Report issued Nov. 26, 2003 for International Application No. PCT/US03/20312, International Filing Date Jun. 26, 2003, 4 pages.
PCT International Preliminary Examination Report issued May 10, 2005 for International Application No. PCT/US03/20312, International Filing Date Jun. 26, 2003, 11 pages.

* cited by examiner

*Primary Examiner*—William L. Miller
(74) *Attorney, Agent, or Firm*—Snell & Wilmer L.L.P.

(57) ABSTRACT

A method and apparatus for determining fastener axial loading includes a fastener insert having an arched bottom surface, which deflects correlative to the level of axial loading. A load indicating mechanism determines axial loading by measuring the amount of deflection experienced by the arched insert. In addition, the arched insert stores elastic energy which is added to the overall elastic energy of the fastener, thereby aiding the fastener integrity during use. The system comprises a zeroing mechanism and full-scale adjustment mechanism for calibration of the system, and an apparatus for measuring in-service load.

9 Claims, 14 Drawing Sheets

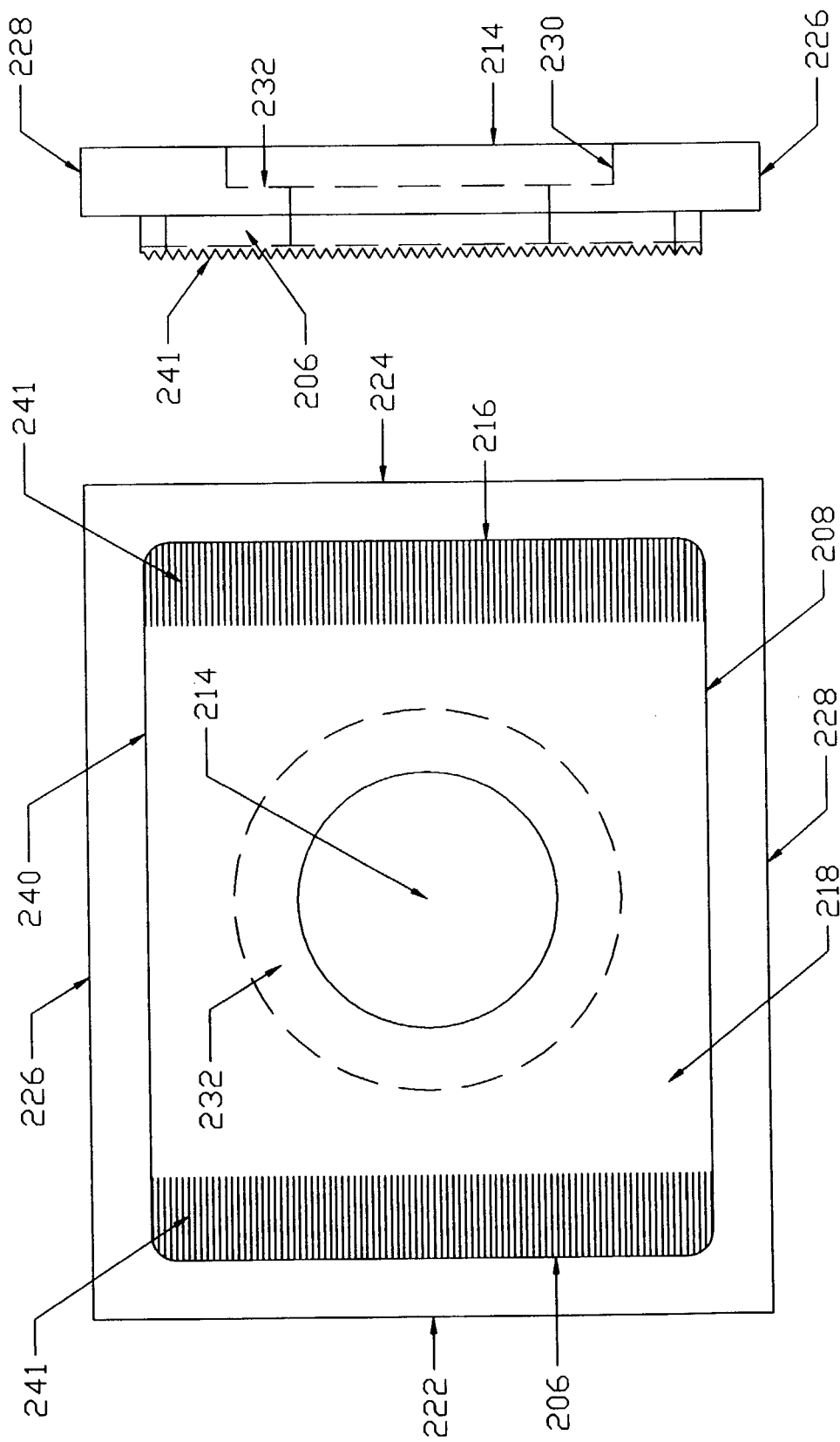

LOAD INDICATING FASTENER INSERT

CROSS REFERENCE TO RELATED APPLICATION

This application is a continuation in part of and claims priority to U.S. patent application Ser. No. 09/992,871, titled "LOAD INDICATING WASHER," filed on Nov. 16, 2001, now abandoned.

BACKGROUND OF THE INVENTION

1. Field of Invention

This invention generally relates to load indicating fasteners, and more particularly, to a low profile load indicating and energy-storing device adapted to visually indicate the load in a fastener.

2. Description of the Related Art

Fasteners are used in a wide variety of applications, such as motors, railroad tracks, flange assemblies, petrochemical lines, foundations, mills, drag lines, power turbines and studs on cranes and tractors. As is known in the use of such fasteners, as force is applied to a portion of the fastener, e.g. a head of a bolt or the like, the fastener experiences a strain described as the fastener load. As the fastener is tightened, this load increases to a maximum break point, where the fastener breaks or its integrity is otherwise compromised. Therefore, it is desirable that applied fasteners should be properly tightened to design load levels in order to ensure that secure joints are achieved without compromising the fastener viability. In many applications, however, achieving the proper fastener tightness and maintaining this tightness once the system is placed in service is problematic. For various applications, optimal loads are known and/or are obtainable, but currently available methods and apparatus do not adequately enable reliable and repeatable determinations thereof.

During use, fasteners typically experience a loss of tension e.g. tightness, due to, for example, a variety of in-service occurrences including: relaxation (thread embedment), vibration loosening, compressive deformation in the joint or flange, temperature expansion or contraction, etc. The loss of tension that results from these occurrences can cause premature wear in the assembly, leakage (in applications where the fastener is used for sealing), or critical joint failure due to excessively high loads on other members of the assembly. Such potential failures are catastrophic in systems where premature wear, leakage or joint failure may result in loss of life.

An apparatus and method is therefore needed which permits the accurate tightening of a fastener to optimal load levels and which permits the determination of the existing fastener load status.

It is well known that indicated tensile strain gives a true representation of the load induced in a fastener. Various prior art tensile strain indicators may concentrate on the tensile strain of the individual members of the fastener, such as for example, the fastener washer. One such indicator is described in U.S. Pat. No. 6,250,863, issued to Kamentser et al., which purportedly discloses a washer having a plurality of strain gauges integrated into the body of the washer. The Kamentser patent discloses two sets of strain gauges, at least one of which is positioned on a portion of the washer subjected to axial force, and at least one of which is positioned on a portion of the washer not subjected to axial force. The strain gauges are connected into a common bridge circuit which purportedly provides a signal indicating the axial stress applied to the washer body.

Several problems, however, are associated with the fasteners described in the Kamentser patent. For example, in most instances it is cost prohibitive to integrate the electrical measuring devices into the body of each individual washer. Additionally, the integrated instrumentation, which are placed in the body of the washer, compromises the overall integrity of the fastener and is thus not suitable for applications using fasteners in a rugged environment. Thus, a need exists for a device to measure tensile strain, is not cost prohibitive, and which additionally does not compromise the overall fastener integrity when used in a rugged environment.

Other prior art systems avoid the problems inherent in using integrated electrical components and instrumentation by using mechanical load indicators. For example, UK Pat. Number GB-2-179-459-A, issued to Ceney, discloses an externally mounted mechanism for indicating the tightness of a fastener. This system includes a pin positioned in the bore of the fastener that extends out of the fastener end. Upon extension of the bolt, the pin applies pressure to fulcrumed levers positioned perpendicular to the axis of the bolt. The levers, which are acted upon by a compression spring, are then visible through a window cover for visually inspecting washer load levels.

Due to the complex arrangement of the levers, and position of the indicator window inherent in the design of this system, the indicator components typically must be positioned on the outside of the bolt. Since the indicator components are rather bulky relative to the washer, the use of the Ceney system is often not possible in fastener environments having space constraints. In cases where it is possible to use such a configuration, the elements of the instrument may be susceptible to outside forces and damage. Upon damage, no convenient method exists to verify whether the unit may still be calibrated.

Therefore, a need exist for a load indicating system which conforms to the space limitations of a fastener environment, and which includes means for readily identifying when the load indicator is not valid or the fastener is not at its desired load level.

It should be further noted that one of the main indicators of efficient clamp retention in a joint is the amount of elastic energy the bolt and other joint members can absorb. Regardless of the tightening technique used, when a bolt in a bolted joint is tightened, the bolt stretches elastically and stores energy. In this manner, the bolt acts as a spring and the stored energy facilitates the holding of the joint together at a specified load level.

To ensure that a fastener includes the highest amount of elastic energy, fastener designers typically focus on the grip length of the bolt used in the system. It is well known that the longer the grip length of a bolt, the more the energy the bolt will store in the fastener system. Consequently, a longer bolt having a longer grip length, will be able to store more elastic energy than a shorter bolt having a shorter grip length. Thus, the increased grip length of a longer bolt makes using the longer bolt in a fastener more preferable than using the shorter bolt. This is true because, the increased energy stored in the longer bolt is advantageous in that it enhances the integrity of the joint making the joint more tolerable to loosening or failure due to in-service loading.

In many fastener systems, however, the use of the longer bolt is prohibited by space limitations, requiring the system to use a shorter bolt. As noted, because of the shorter grip length, the shorter bolt stores less elastic energy than the longer bolt, which makes the fastener more susceptible to loosing or failure. It is well known, however, that the grip length of the shorter bolt can be made longer, through the use of washers or sleeves which cause the shorter bolt to elastically stretch further and store more energy.

Unfortunately, the bolt's shorter length puts an upper limit on the number of washers which may be used to increase the shorter bolt's grip length. This, in turn, means that, in general, a shorter bolt may only be made to store a limited amount of elastic energy to aid in holding the joint together. Therefore, where, as in many instances, there are space constraints requiring the use of the shorter bolt, a fastening system may be used which results in poorly designed joints, since the shorter bolt may store an inadequate amount of energy. This poor grip length bolt diameter-to-length ratio may inevitably lead to joint loosening or failure.

A fastener system is therefore desired which would allow use of a shorter bolt while not compromising the amount of energy stored in the fastener when a longer bolt is used. Such a fastener system may include the storage of additional elastic energy above that already stored in the bolt, and may additionally increase the effective grip length of the shorter bolt improving the fastener clamp retention property.

Consequently, presently known fasteners employing load indicators remain inadequate, particularly since these fasteners typically incorporate integrated electrical components, complex designs and/or are subject to loss of effectiveness do to loss of calibration or elastic energy over extended use. A need, therefore, exists for a load indicating fastener system which avoids the problems inherent in the prior art while providing an accurate reading of the tensile strain, e.g., load, being placed on the fastener system, and which stores additional energy allowing for the effective use of shorter bolts in a particular fastener system.

SUMMARY OF THE INVENTION

The present invention provides a load indicating fastener system which addresses many of the shortcomings of the prior art. In accordance with various exemplary aspects of the present invention, a load indicating fastener insert is provided which stores elastic energy and which uses a load indicating system allowing visual indication of the load level of the fastener system with relative ease. It should be noted that while the following description is of a load-indicating washer, the present invention is not so limited. That is, any fastener component which indicates fastener load and/or stores energy in accordance with the following description is contemplated to be within the scope of this invention. Consequently, while the following description is of a load indicating washer, the washer is merely illustrative of any suitable fastener insert or sleeve which may be used as a part of a fastening system. As such, the term washer, fastener insert, and joint may be used interchangeably for the purposes of the description and claims provided herein.

In accordance with one exemplary embodiment of the present invention, a load indicating system may include a washer configured to store elastic energy during use. Such stored elastic energy may be added to the elastic energy of the fastener bolt thereby increasing the overall stored elastic energy of the fastener system. By increasing the amount of elastic energy in the fastener system, the washer may increase the fastener integrity and minimize the requirement that a longer bolt be used. In particular, the washer may store elastic energy such that the effective grip length of a shorter bolt is increased, allowing use of a shorter bolt in fastening applications where space is limited. A washer in accordance with this invention may include an arched surface. The arched surface may be substantially perpendicular to the direction in which a tightening force is applied. The arched surface may permit the washer to deflect in the direction of the tightening upon application of an axial load. To facilitate understanding of the invention, the deflection is described in the downward direction. The downward deflection ("dishing") which occurs permits the washer to act as a spring storing elastic energy. The stored elastic energy in the washer may be added to the overall elastic energy of the fastener system, thereby aiding in increased joint integrity.

In accordance with another exemplary embodiment of the invention, the load indicating system uses a removable pin attached in the center of the washer face to drive a load indicating mechanism affixed at opposing ends of the washer front surface. The placement of the load indicating mechanism at the opposing ends of the washer front surface is such that the main body of the load indicating mechanism undergoes negligible movement relative to the washer deflection as the washer dishes under load. As noted, when an axial force is applied to the washer, the washer experiences a dishing. The dishing, which is correlative to the amount of the applied axial load, may be measured by the load indicating mechanism system load indicator. The load measurement may then be determined by visual inspection of the load indicator. Consequently, the desired load amounts may be achieved by loading the washer to a corresponding deflection as measured by the load indicator. Once the load is removed, the elastic energy contained in the washer is released and the washer returns to its original unloaded position, wherein the load indicator visually indicates that no load is present.

In yet another exemplary embodiment, the load indicator of the present invention includes a load indicating scale including visual representations of measured axial loading. The load indicator may include a load indicating pointer configured to indicate loading of the washer by coming to rest on a visual representation of the load indicating scale during axial loading. The pointer may return to the no load visual representation of the indicator scale once the load is removed. The load indicator may additionally include a load set pointer for indicating the initial and/or maximum load level of the load indicating system. The load set pointer may be positioned correlative to the load indicating pointer, such that the load set pointer points to the visual representation indicating the maximum axial loading of the load indicating system during use. The load set pointer may continue to point out the maximum (or initial) load level experienced by the load indicating system once the axial loading is removed.

Thus, the load set pointer may be used as a set point for the load indicating pointer for indicating the initial loading position of the washer. In one exemplary embodiment, the load set pointer may be driven by the load indicating pointer upon initial loading and remain fixed at the initial loading position, such that when the load indicating flag moves due to washer unloading, relaxation, deformation, expansion, contraction or the like, such movement from the initial loading position can be easily detected upon casual visual inspection.

In another exemplary embodiment, the load indicating system may include mechanisms to adjust the zero setting, indicating no axial loading on the load indicating scale and to also adjust the range of the load/deflection response.

In still another exemplary embodiment, the load indicator system may include an immovable load indicator, comprising an immovably affixed deflection indicator, an adjustable member positioned within the immovably affixed deflection indicator, and a load indicating feeler gauge. Before axial loading, the adjustable member is adjusted to indicate "zero" loading of the washer. Once an axial load is applied, the washer body deflects correlative to the amount of axial loading. The system user may then use the load indicating feeler gauge to determine the amount of axial loading on the washer, by measuring the amount of deflection with respect to the adjustable member.

In yet another exemplary embodiment the load indicator may include transducers (e.g., displacement or pressure transducer, etc.) capable of being coupled to a portable visual load indicator, for translating the transducer signal into a readable value representing axial load levels. The axial load on the washer, and the associated washer strain, may be detected by the transducer and correlated into an electrical signal readable by the portable visual load indicator, which in turn, gives a visual reading of the amount of axial load present. The portable visual load indicator may include an electrical output device or mechanical output device which presents the transducer signal to be read in accordance with the fastener axial load.

BRIEF DESCRIPTION OF THE DRAWINGS FIGURES

A more complete understanding of the present invention may be derived by referring to the various exemplary embodiments of the present invention, which are described in conjunction with the appended drawing figures in which like numerals denote like elements, and in which:

FIG. 2C depicts a second side view of an exemplary washer in accordance with an exemplary embodiment of the present invention;

FIG. 2D depicts a bottom view of an exemplary washer in accordance with an exemplary embodiment of the present invention;

DETAILED DESCRIPTION OF VARIOUS EXEMPLARY EMBODIMENTS

The following descriptions are of exemplary embodiments of the invention only, and are not otherwise intended to limit the scope, applicability or configuration of the invention. Rather, the following description is intended to provide a convenient illustration for implementing various embodiments of the invention. As will become apparent, various changes may be made in the elements described herein without departing from the spirit and scope of the invention. For example, though not specifically described, various shapes and orientations of the washer, load indicator mechanism, the load indicator pointer and load set pointer, and combinations thereof should be understood to fall within the scope of the present invention.

In accordance with various exemplary embodiments of the invention, a load indicating system is disclosed including a washer insert (e.g. washer) for use with a fastener. As noted, the washer may be of any configuration for storing elastic energy during axial loading, but preferably, the washer includes at least one arched surface permitting the washer to dish during loading. The arched surface may be convex or concave relative to a geometric plane drawn laterally through the washer body or substantially perpendicular to the direction of the axial loading. As described more fully below, the washer dishes relative to the arched surface causing the washer to store elastic energy during use.

Figure 1A:
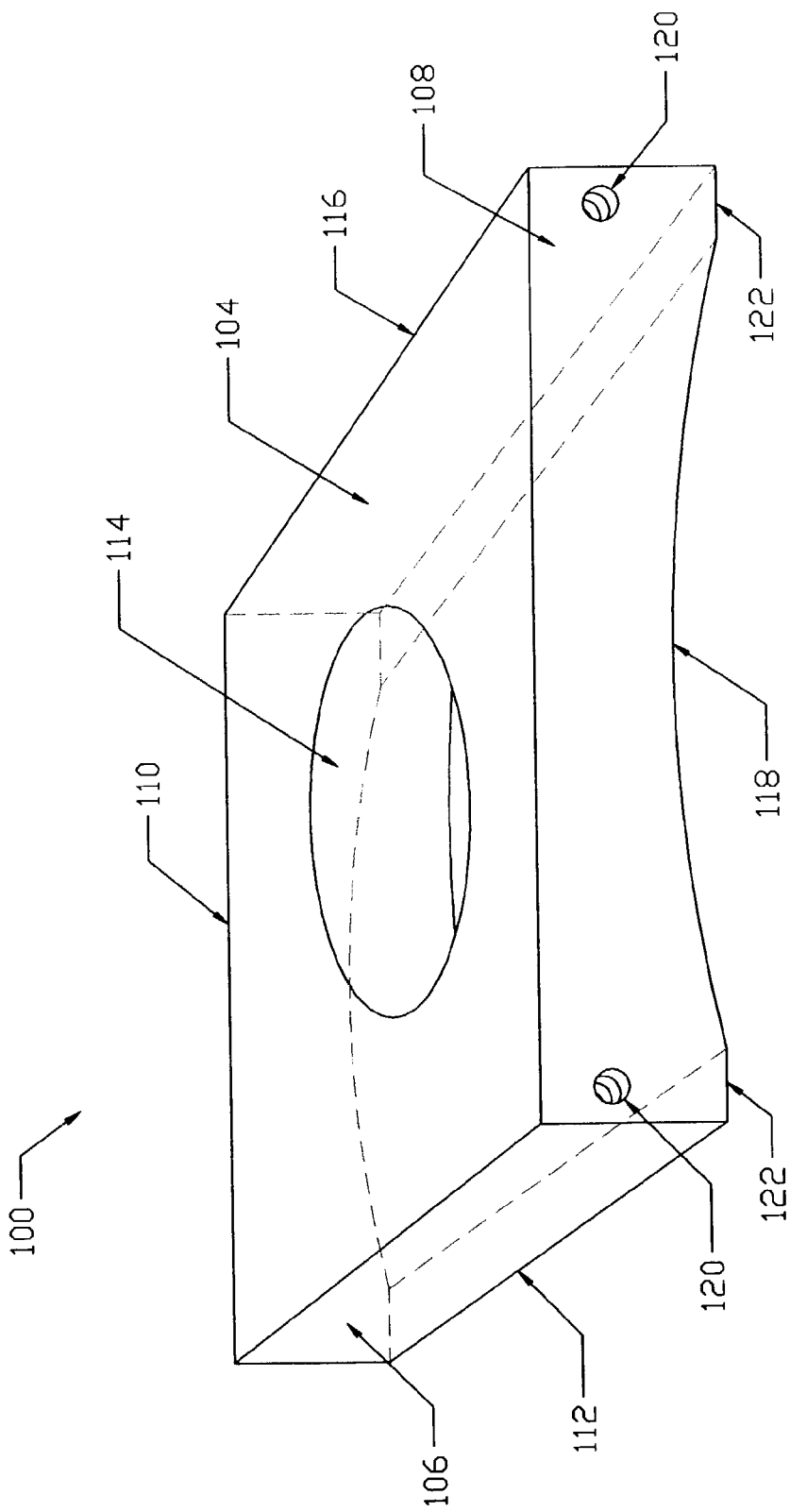
FIG. 1A depicts an exemplary washer in accordance with an exemplary embodiment of the present invention.
Figure 1B:
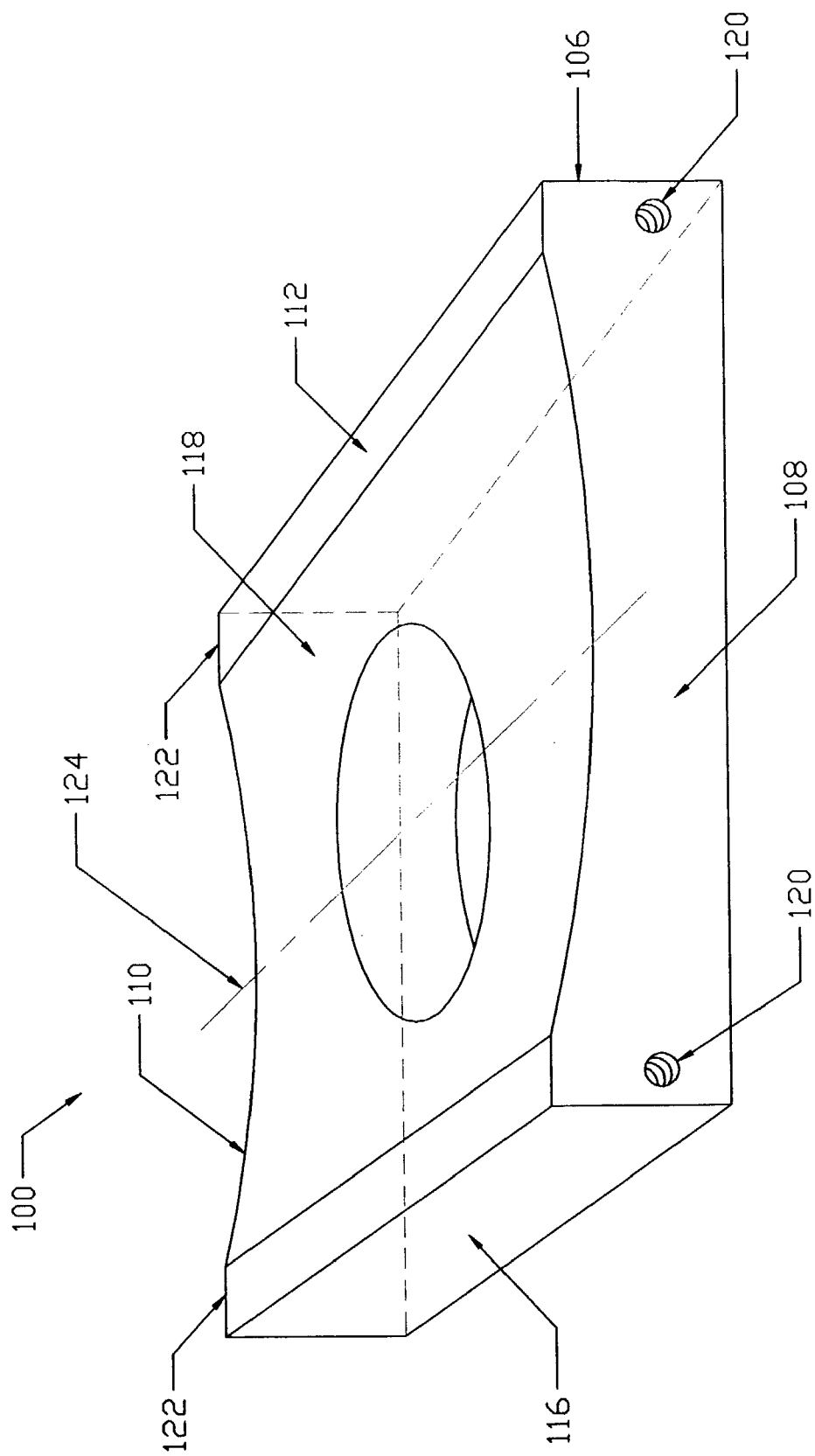
FIG. 1B depicts a bottom view of an exemplary washer in accordance with an exemplary embodiment of the present invention.

With reference to FIGS. 1A and 1B, what is shown is an exemplary embodiment of a washer 100 for use with this invention. As can be seen, washer 100 may be substantially rectangular in shape. It should be noted that although the washer 100 is depicted as substantially rectangular, other washer shapes might be suitable for use with the present invention. For example, washer 100 may be oblong, elliptical, polygonal, or any such shape wherein the washer 100 includes a substantially stationary edge, is capable of dishing and/or includes an axial bore for receiving a fastening means (e.g., bolt). In particular, washer 100 may comprise a substantially flat upper surface 104, a front side surface 108, a rear side surface 110, a left side surface 106 and a right side surface 116, where the aforementioned side surfaces are perpendicular to the flat upper surface 104. Washer 100 further includes a central bore 114 formed axially to the washer 100 centroid for use in inserting a load producing fastener such as a bolt, or screw, or the like (not shown).

FIG. 1B shows a bottom view of washer 100, wherein it can be seen that the geometric plane including bottom surface 112 of washer 100 may be drawn substantially parallel to upper surface 104. That is, bottom surface 112 is configured such that the outer portions 122 of the bottom surface 112 of washer 100 substantially parallel to upper surface 104. In addition, outer portion 122 may be elevated from the center axis 124 of an arched surface 118 of washer 100 as described more fully below, to provide a surface for containing the surface of the article with which the washer is to be used. For example, in the presently described embodiment, bottom surface 112 includes a spherical portion 118, e.g. an arc, where arc 118 is formed such that arc 118 is included in washer bottom surface 112 from washer front side surface 108 to washer rear side surface 110. The arc 118 may be characterized by a radius chosen to ensure that the washer upper surface 104 may deflect downward relative to the axial loading applied at the washer centroid. In this way, the dimensional characteristics of the washer 100 (e.g., washer thickness, length, width, and radius of the arc 118) may be chosen such that a desired deflection of the washer 100 may be measured relative to the amount of applied axial loading. The desired dimensional characteristics may be chosen in accordance with the amount of desired elastic energy necessary to be stored in the fastener to ensure fastener effectiveness. The methods for determining the necessary elastic energy are known, and will not be repeated here for brevity. Such calculations, however, may include consideration of the materials used in the fastener construction, available bolt, screw or pin length, and/or the tension required to properly torque or tighten the fastener, etc.

Figure 3A:
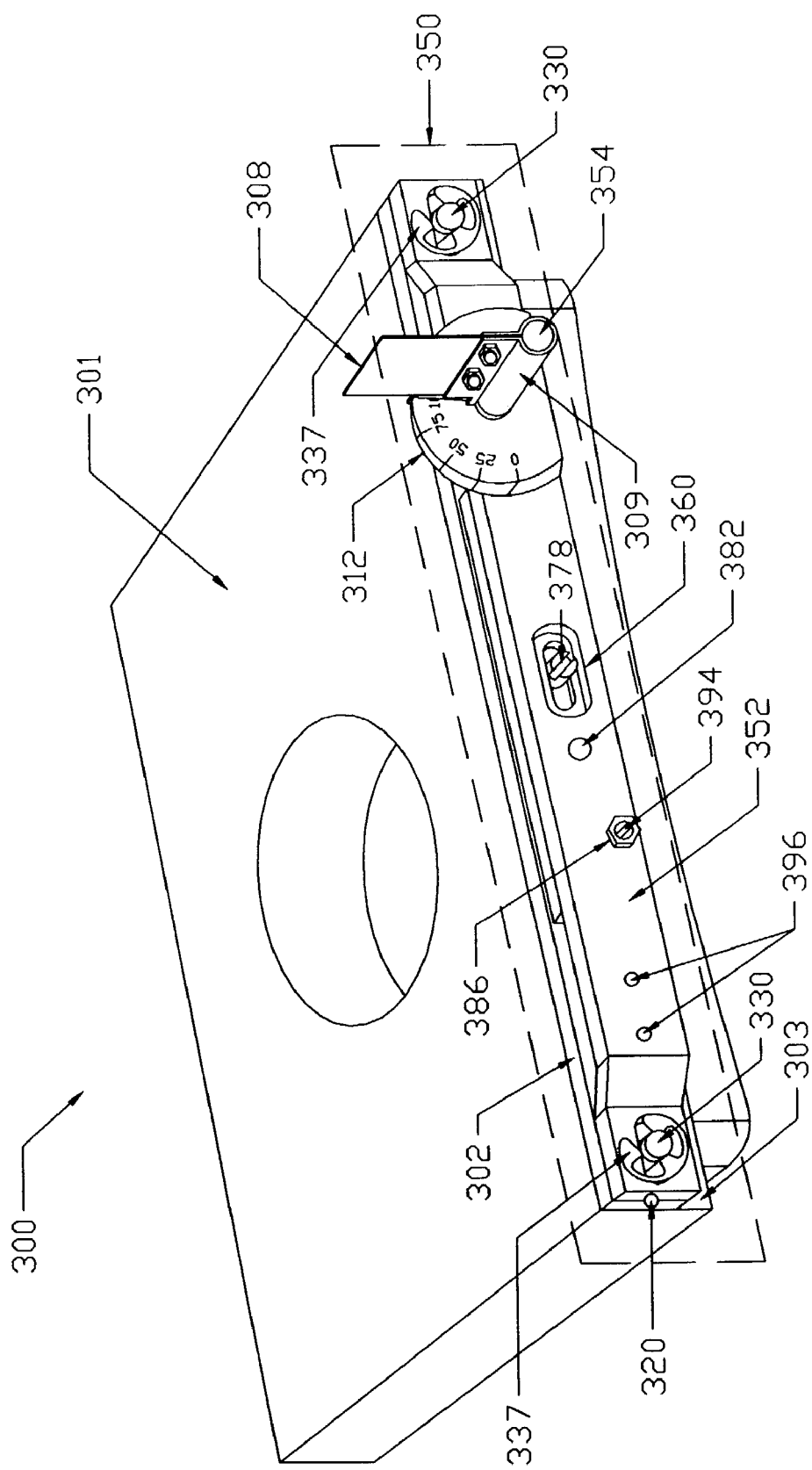
FIG. 3A depicts an exemplary embodiment of a load indicating system in accordance with the present invention.

The front surface 108 further includes front bore holes 120 for use in affixing to washer 100 a load indicator mechanism as described more fully below. Front bore holes 120 may be any suitable configuration for use in affixing a front load indicator mechanism 350 as shown in FIG. 3A. For example, where the indicator plate system is affixed using conventional screw structures, front bore holes 120 may be threaded.

Figure 2A:
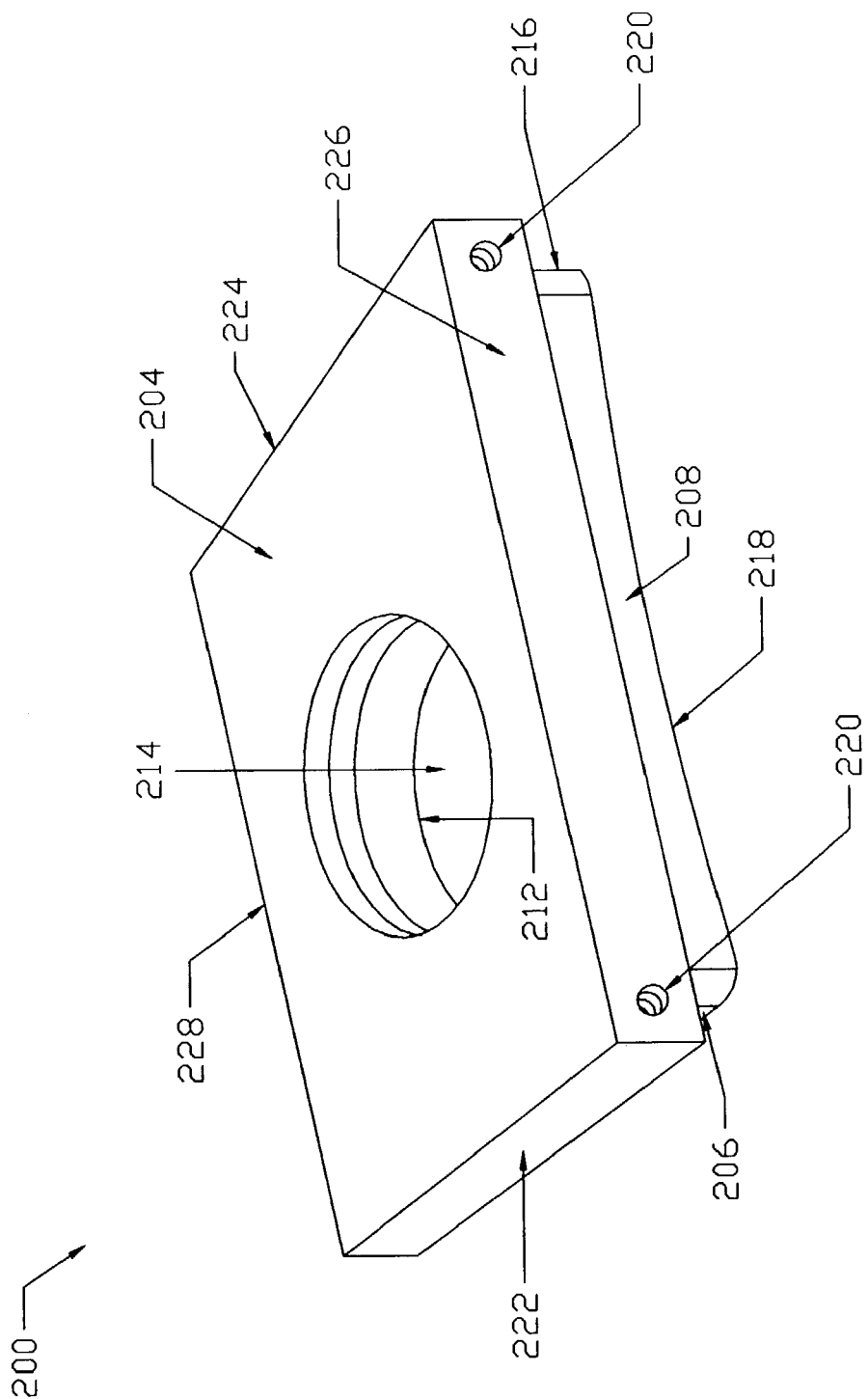
FIG. 2A depicts another exemplary washer in accordance with an exemplary embodiment of the present invention.
Figure 2B:
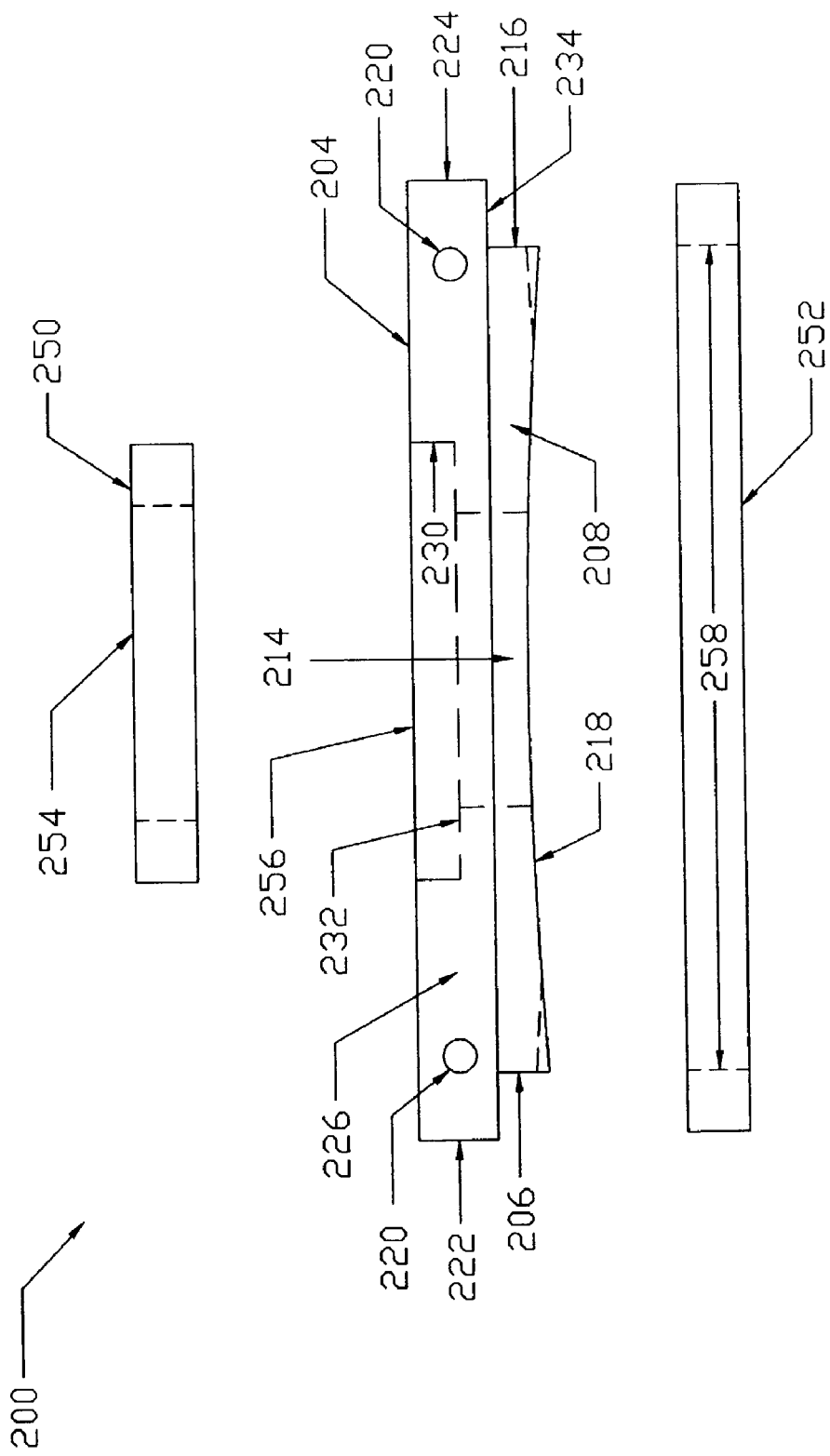
FIG. 2B depicts a first side view of an exemplary washer and seals in accordance with an exemplary embodiment of the present invention.

FIGS. 2A–2C show another exemplary embodiment of a washer 200 in accordance with the present invention. As shown, washer 200 is substantially rectangular in shape, including a substantially flat upper surface 204 which further includes a central bore 214 formed axially to the washer centroid in substantially the same manner as was described with respect to bore 114 of washer 100. Washer 200 further includes a front surface 226, rear surface 228, and side surfaces 222 and 224 each of which may be substantially perpendicular to the upper surface 204. Washer 200 further includes an arched surface 218 of similar description as arc surface 118 of washer 100.

In accordance with this exemplary embodiment, washer 200 may be used in any application wherein various circular and/or rectangular seals may be required. As such, washer 200 may be configured to accommodate any such seals as are commonly known in the fastener industry. For example, as shown in FIG. 2B, where a circular seal 250 is required to be fitted around a fastener (e.g., bolt, screw, pin) inserted at central bore 214. Central bore 214 may be formed such that the circular seal 250 containing a central aperture 254 for insertion of the bolt may be inserted or fitted into the upper surface 204 of the washer 200. Similarly, where a rectangular seal 252 is required, washer 200 bottom may be configured such that the rectangular seal may be positioned circumspect to the washer bottom portion defined by bottom portion front surface 208, bottom portion rear surface 240 (shown in FIG. 2D), and bottom portion side surfaces 206 and 216. The construction and operation of typical seals for use with industrial washers are commonly known and, as such, the seals will not be described herein in detail. With reference to FIGS. 2A–2C, what is shown is an exemplary embodiment of washer 200 formed to accommodate the aforementioned circular and rectangular seals.

With reference to FIG. 2B, what is shown is a washer 200 including a circular recess 256 to accommodate a circular seal 250 configured to fit circumferentially around, for example, a bolt-like fastener in the manner described above. In particular, central bore 214, may include a circular recess 256 centrally positioned to the axis of central bore 214 and configured to receive the circular seal 250. The circular recess 256 may be formed by a circular wall 230 running circumferentially to the axis of central bore 214 and perpendicular to the washer upper surface 204. The diameter of circular wall 230 may be larger than the outer diameter of the circular seal 250. In addition, the depth of the circular wall 230 may be such that the circular seal 250 may be inserted into the circular recess 256 wherein it may come to rest on a recess bottom 232 drawn radially to the circular wall 230. It should be understood then, that when a circular seal 250 is inserted into the circular recess 256, a fastener such as a bolt may be freely inserted into the central bore 214 opening to protrude out the washer bottom surface 212, without obstruction where bottom surface 212 may have generally similar description as bottom surface 112 described above.

With further reference to FIG. 2B, a bottom surface 234 of washer 200 may be formed to accept a rectangular seal 252 when required. The width and length of bottom surface 234 may be chosen such that the perimeter of the bottom surface 234 is larger than the inner perimeter 258 of the rectangular seal 252 allowing the rectangular seal 252 to abut against the bottom surface 234 without inhibiting the use of a fastener such as a bolt.

With reference to FIGS. 2C and 2D, another exemplary embodiment of a washer 200 in accordance with the present invention is shown, including serrations 241 on the outer edges of the bottom surface 212 and positioned parallel to arc 218. Such serrations 241 may be included in the washer 200 design, wherein it may be necessary to minimize washer 200 movement during loading of the washer 200. That is, the serrations 241 are configured to come in contact with a generally immovable surface, such that the serrations render the washer substantially stationary in the direction perpendicular to the serrations during use. The immovable surface may, for example, be the article to be fastened.

It should be noted that the dimensions of washers 100 and 200 may be chosen as required by the particular application in which they are used. For example, the length, width and depth of the washer may be chosen to accommodate space considerations. Furthermore, washers 100 and 200 may be of any material capable of withstanding the load required for a particular application. For example, washers 100 and 200 may be constructed of various steel and steel alloys as required. Moreover, as previously noted, washer dimensions and material considerations may be contemplated to configure larger or smaller washers, or washers using lighter or heavier graded materials, as a particular fastening application may require. Further still, while the exemplary washer embodiment shown in FIGS. 2A–2D include variations suitable for accommodating circular and rectangular seals, and serrations to minimize washer 200 movement, it should be understood that the embodiment is exemplary of a washer capable of receiving such seals. That is, washer 200 may be configured to accept at least one of the seals or none of the seals as the application requires, and further may be configured with or without the noted serrations.

As noted, in similar manner as with respect to washer 100, 200, washer 300 experiences dishing correlative to the amount of axial loading. The amount of axial loading is one indicator of fastener viability. Thus, a fastener system which measures axial loading is disclosed. Such a system may include a mechanism capable of translating the amount of washer dishing into a readable or measurable quantity. That is, the mechanism may translate the dishing into, for example, percent of maximum axial loading, where the maximum axial loading may be the fastener break point. The mechanism may translate the amount of dishing into any measurement (e.g. torque) indicative of the axial force applied in tightening the faster system in which the load indicating system of the present invention is used. The load indicator mechanism may be mechanical, electrical or a combination thereof as described below.

Figures 3B, 3C:
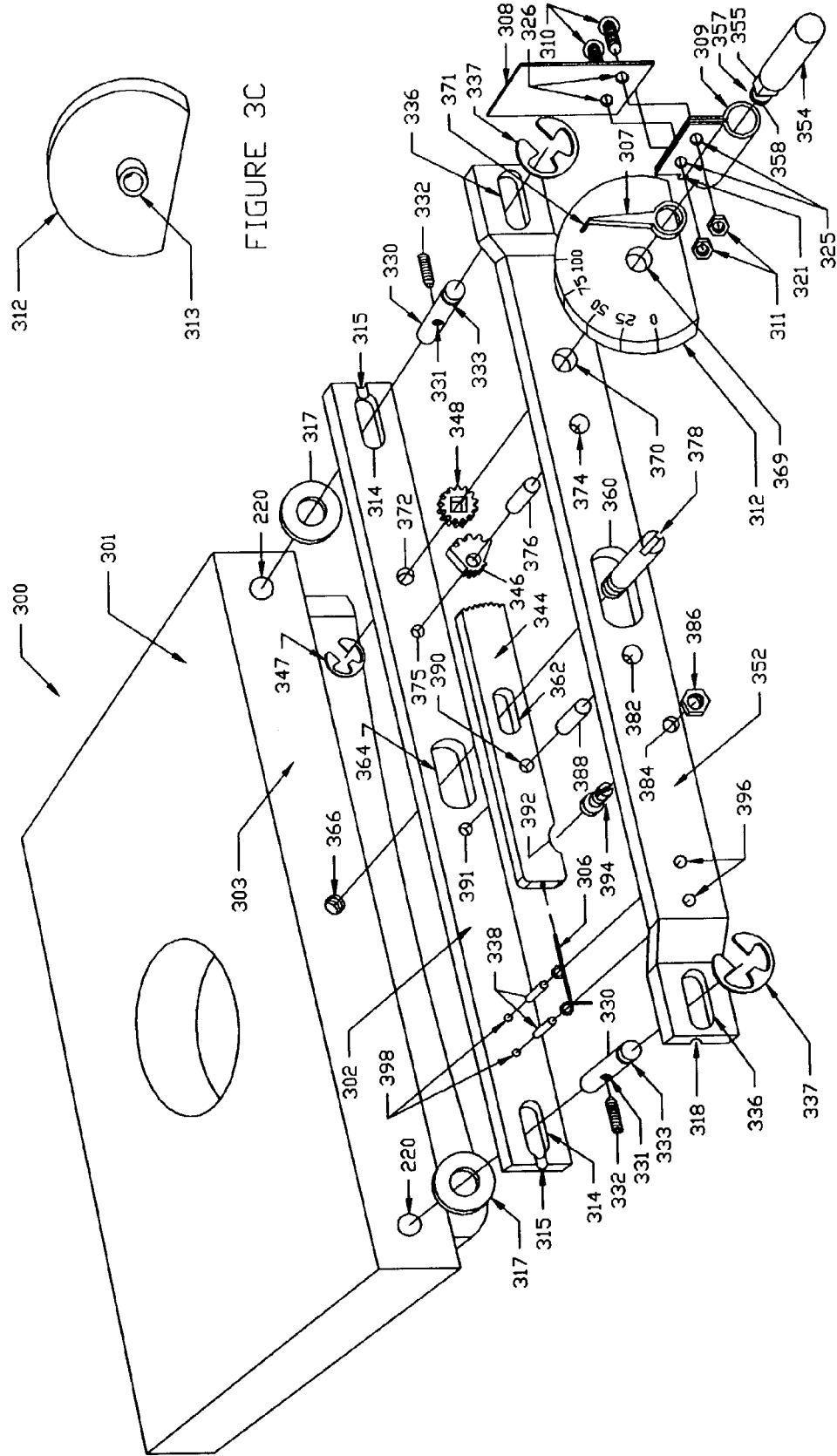
FIG. 3B depicts an exploded view of an exemplary embodiment of a load indicator mechanism in accordance with the present invention.
FIG. 3C depicts a back view of the load indicating scale in accordance with an exemplary embodiment of the invention.

With reference to FIGS. 3A–3D, what is shown is an exemplary embodiment of a load indicating system 300 for use with the present invention, wherein a load indicator mechanism 350 is depicted attached to a washer 301 front surface 303. It should be noted that washer 301 may be of similar construction to washer 200 such that like elements will have similar descriptions as like elements with respect to washer 200. Further, it should be noted that while load indicator mechanism 350 is described with respect to washer 301, the embodiment is not to be so limited. For example, load indicator mechanism 350 may be described with respect to washer 100, 200 or any suitable variations thereof described above, wherein the washer additionally includes a recess of similar description as recess 366. As such, it is understood that the reference to washer 301 with respect to FIGS. 3A–3C is merely illustrative.

In this exemplary embodiment, load indicator mechanism 350 is configured to translate washer deflection to a quantity readable on load indicating scale 312. In this exemplary embodiment, mechanism 350 may be a multi-gear arrangement. As the washer deflects under axial loading, the gears of mechanism 350 translate the amount of deflection as indicated on scale 312.

As can be seen more fully with reference to FIG. 3B, washer 301 includes a front surface 303 having a hole 366 positioned centrally to washer front surface 303. Load indicator mechanism 350 (shown in FIG. 3) includes an inner plate 302 including bore holes 372, 375, 391 and 398, in addition to slotted apertures 314 and 364, where slotted apertures 314 are positioned at opposing ends of the inner plate 302 and are aligned with bore holes 220 of washer 301 and slotted aperture 364 is positioned centrally to inner plate 302 and is aligned with hole 366 of washer 301. The outside surface of inner plate 302 may also contain generally semi-circular grooves 315 extending longitudinally from the outboard ends of slotted apertures 314 to the ends of inner plate 302, the purpose of which is explained below. In addition, load indicator mechanism 350 may also include spacers 317 aligned centrally with bore holes 220 of washer 301 and slotted apertures 314.

Load indicator mechanism 350 may further include an outer plate 352 having slotted apertures 336 positioned at opposite ends of the outer plate 352. The position of slotted apertures 336 is such that they align with slotted apertures 314 of inner plate 302, which, as noted, are further aligned with bore holes of spacers 317 and bore holes 220 of washer 301. In this arrangement, both the inner plate 302 and the outer plate 352 of the plate system 350 may be attached to washer 301 using fasteners 330. Fasteners 330 may be any configuration for securing a load indicator mechanism 350 to washer 301. In that regard, fasteners 330 may be bolts, screws, pins, or the like, or may include any other suitable securing means such as, gluing, soldering, welding or the like. In the exemplary embodiment shown, fasteners 330 may be, for example, retainer pins 330 which may immovably secure the mechanism inner plate 302 and outer plate 352 to the washer front surface 303. In securing the inner 302 and outer 352 plates to washer 301, the spacers 317 may be positioned circumspect to fasteners 330, and the inner 302 and outer 352 plates may be positioned onto fasteners 330 through slotted apertures 314 and 336 respectively. Where the fasteners 330 are retainer pins, the inner 302 and outer 352 plates may be affixed to washer 301 using retainer clips 337 permitting translational movement which is controlled, for example, during quality control testing of the load indicating system 300.

Outer plate 352 also includes a slotted aperture 360, aligned with aperture 364 of inner plate 302, which is further aligned with threaded hole 366 of washer 301. Additionally, outer plate 352 includes bore holes 396 and a bore hole 370 respectively aligned with bore holes 398 and bore hole 372 of inner plate 302. The inside surface of outer plate 352 also contains generally semi-circular grooves 318 of similar arrangement as grooves 315. That is, grooves 318 may extend longitudinally from the outboard ends of slotted apertures 336 to the ends of outer plate 352. These semi-circular grooves 318 align with semi-circular grooves 315 of inner plate 302 to form longitudinal circular access holes 320 as shown in FIG. 3A when inner plate 302 and outer plate 352 are attached to washer 301 as described previously. In some instances, it may be necessary to adjust the load/deflection response of mechanism 350 subsequent to manufacturing and prior to use. Therefore, mechanism 350 may include screws 332 which may be rotated to translationally adjust the load indicator mechanism relative to washer 301. Thus, holes 320 provide access for a suitable tool to rotate screws 332 (e.g. screwdriver) for adjusting the load/deflection response of washer 301, as described below.

Interposed between inner plate 302 and outer plate 352 are a series of gears for translating axial loading into a readable quantity. In the exemplary embodiment shown the gears may be defined by a main drive gear 344, a combination gear 346, and a pinion gear 348. Main drive gear 344 may include slotted aperture 362 of similar shape as apertures 364 and 360 described above. Slotted aperture 362 may be smaller than apertures 364 and 360. Main drive gear 344 is positioned between the inner plate 302 and the outer plate 352 such that the main gear aperture 362 is aligned with both aperture 364 of inner plate 302, and with aperture 360 of outer plate 352, as well as, threaded hole 366 of washer 301.

Main drive gear 344 further includes a bore hole 390 which is aligned with bore hole 382 of outer plate 352 and bore hole 391 of inner plate 302, such that the main drive gear 344 may be held in place and allowed to rotate using a suitable fastener 388 (pivot pin 388) such as a screw, pin or the like, where the fastener is positioned through both bore holes 382, 390 and 391. Further, main drive gear 344 includes a semi-circular recess 392 on lateral edge of gear 344, which is aligned with bore hole 384 of outer plate 352. In this arrangement, a screw 394, including a cam-shaped head, may be rotatably inserted into hole 384 such that the cam-shaped head of screw 394 may be abutted against the semi-circular recess 392. The screw may be threaded into hole 384 or may be inserted into hole 384 and rotatably fastened using a mating nut 386. The screw 394 may then be used to enable the main drive gear to be spring loaded at the zero position on scale 312 when no loading is present. That is, since the cam-shaped (e.g. oblong, elliptical, etc.) head of the screw 394 is abutted against the semi-circular recess, the main drive gear may be rotated by turning screw 394 thereby rotating a load indicating pointer, as described below. In this way, the load indicating pointer may be adjusted to indicate no axial load (e.g. zero load) prior to use thereby zeroing mechanism 350.

Any translational movement of the main drive gear 344 relative to the outer plate 352 and inner plate 302 is restricted by pivot pin 388 into bore hole 390 of the main drive gear 344 and bore hole 382 of the outer plate 352 and bore hole 391 of inner plate 302. As screw 394 is rotated, its cam-shaped head serves as a zero adjust for the load indicating assembly 356 (shown in FIG. 3D). After adjustment, the zero adjust screw 394 is immovably secured to outer plate 352, for example, using a nut 386.

Positioned through apertures 360, 362, and 364 is a deflection driver 378 which may be securely positioned in hole 366. As washer 301 is loaded, main drive gear 344 may rotate about pivot pin 388. The diameter of deflection driver 378 is slightly smaller than the height of aperture 362 providing a sliding fit, to allow rotational and lateral translation of drive gear 344. For example, main drive gear 344 translates horizontally for adjustment of the load range of the load indicating mechanism 350, as described below. Deflection driver 378 may be immovably affixed to hole 366, by any conventional means, but presumably is threaded to mate with threads included in hole 366. The driver 378 may then be screwed into bole 366 such that translational and rotational movement of driver 378 may be minimized or eliminated. Pins 330 may be pressed into holes 220 of washer 301 and the load indicator mechanism 350 may be held in place affixed to washer 301 using retaining clips 337 inserted into circumferential grooves 333 of pins 330.

Fasteners 330 may be configured with threaded holes 331 for threading or screwing in load/deflection response screws 332 as shown. Holes 331 are threaded laterally through fasteners 330 such that screws 332 may be inserted into holes 331 and through fasteners 330 so that a first end of screws 332 bears against the inside surfaces of apertures 314. Mutual adjustment of screws 332 provides the means to laterally translate main drive gear 344 which may be permanently affixed between inner plate 302 and outer plate 352 with pivot pin 388, thus varying the pivot length between pin 388 and deflection driver 378. This adjustable pivot length alters the load/deflection response of washer 301, allowing the load at 100% on scale 312 to be fine tuned and the washer to be calibrated for maximum load on scale 312 prior to use.

Load indicator mechanism 350 may further include a combination gear 346 including central bore hole aligned with a bore 374 of outer plate 352 and bore hole 375 of inner plate 302. Combination gear 346 is further positioned such that it is interlocked (e.g. meshed) with main drive gear 344 such that the rotation of main drive gear 344 drives rotation of combination gear 346. Combination gear 346 may be held in place by a suitable fastener 376 positioned through the combination gear 346 central bore and through bore holes 374 and 375, where fastener 376 may be a screw, pin, rivet, or the like.

Load indicator mechanism 350 includes a pinion gear 348 including a central square bore aligned with a bore 370 of outer plate 352 and a bore 372 of inner plate 302. Pinion gear 348 is further positioned such that it is interlocked with combination gear 346 and is driven (caused to rotate) by it. Pinion gear 348 may be held in place by a suitable shaft 354 positioned through the square bore of the pinion gear 348, where the shaft 354 may be any suitable screw, pin, rivet or the like, including a first square end 355 configured to tightly fit within the square bore, such that rotation of pinion gear 348 causes rotation of the shaft 354.

Load indicator mechanism 350 further includes a load indicating scale 312 with a central bore 369 which may be aligned with bore 370 of outer plate 352. Load indicating scale 312 includes markings as shown (e.g., 0%, 25%, 50%, 75%, and 100%), for indicating a measurable axial loading of washer 301. In the embodiment shown, load indicating scale 312 is configured to have a protruding boss 313 which may be located on the scale 312 back side (shown in FIG. 3C). The boss 313 may align with hole 370 of outer plate 352. The outer diameter of boss 313 may be configured such that the scale 312 of load indicator assembly 356 (described below) may be affixed to outer plate 352 by, for example, press fitting the boss 313 into hole 370.

Figure 3D:
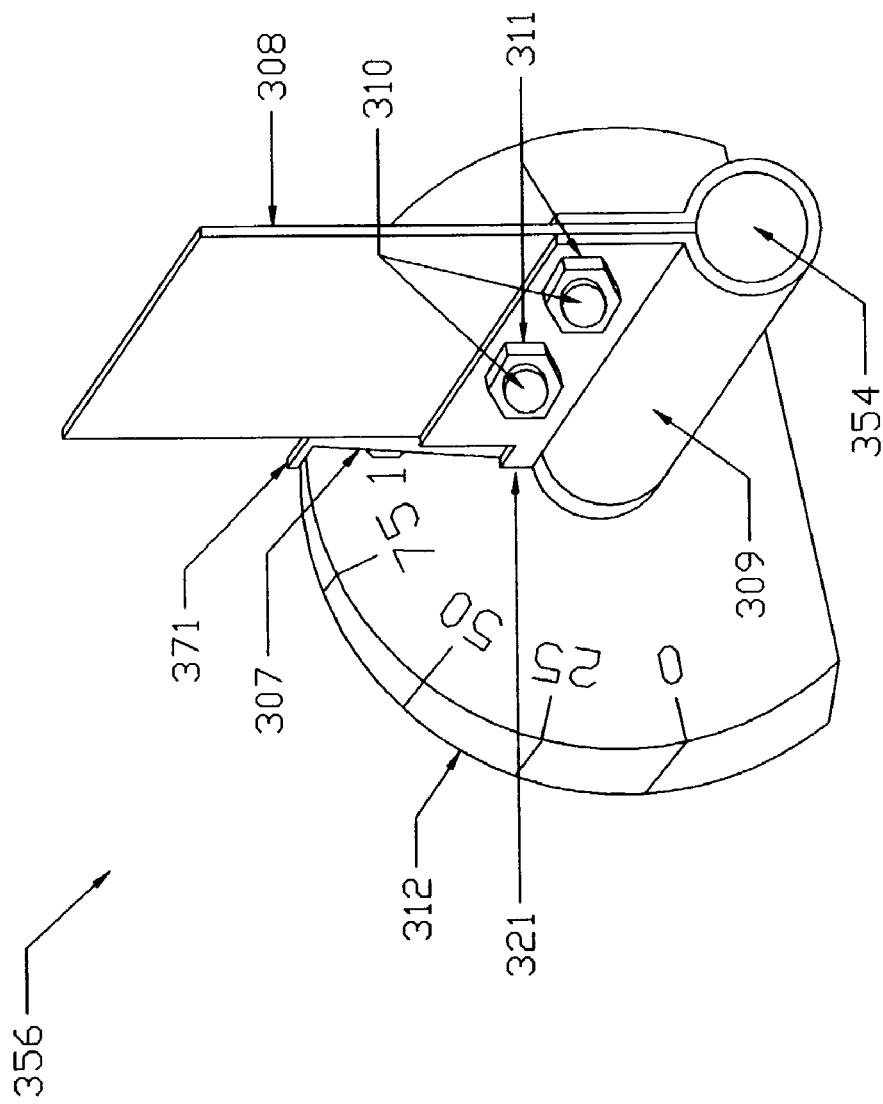
FIG. 3D depicts a load indicating pointer assembly in accordance with an exemplary embodiment of the invention.

As noted, load indicator mechanism 350 may include a load indicator assembly 356 as shown in FIG. 3D. The assembly 356 may include a load indicating pointer system such as, for example, the arrangement given by flag 308, flag retainer 309, fasteners 310 and, nuts 311. Load indicator assembly 356 may also contain a load set pointer 307 for indication of initial washer loading or target loading. Both the load indicating pointer system and the load set pointer 307 indicate to a user the axial loading on washer 301 by pointing to a load indicating marking on scale 312. The load indicating pointer and load set pointer 307 may be any construction useful for indicating to the user the appropriate axial load placed on washer 301, such as those depicted in FIG. 3B.

In the exemplary embodiment shown, flag retainer 309 of the load indicating pointer system may be of sheet metal construction formed circumspect to shaft 354. The retainer 309 may be formed to securely hold shaft 354 and flag 308 such that flag 308 rotates correlative to the rotation of shaft 354. In that regard, the flag retainer 309 may be formed with bore holes 325 which may be aligned with bore holes 326 of flag 308. Flag 308 contains bore holes 326 which align with flag retainer bore holes 325 when flag 308 is inserted between the ears of flag retainer 309. Flag 308 may be affixed to retainer 309 and the assembly may be affixed to the outer end of shaft 354 with fasteners 310 inserted into bore holes 326 of flag 308 and bore holes 325 of flag retainer 309. In one exemplary embodiment, fasteners 310 may include nuts 311 affixed to fasteners 310 for securing flag 308 and retainer 309 to shaft 354.

Shaft 354 is inserted into the bore hole of pointer 307 and the bore hole 369 of scale 312, making up the load indicating assembly 356 shown in FIG. 3D. The outer-most diameter of shaft 354 may be configured to be slightly smaller than the bore of pointer 307 so as to fit rotationally snug within it. Also, the diameter of bore hole 369 of scale 312 is larger than the outer-most diameter of shaft 354 so that shaft 354 rotates freely within it. In addition, the square end 355 of shaft 354 is configured to fit immovably into the square hole of pinion gear 348 and the outer diameter 357 of shaft 354 is configured to fit snugly into the round hole 372 of inner plate 302 and is free to rotate within it. With this arrangement, flag 308 and pointer 307 may rotate relative to scale 312 as pinion gear 348 rotates.

As noted in FIG. 3D, flag retainer 309 may be configured with an extension 321 which abuts against load set pointer 307 allowing pointer 307 to be driven by primary flag 308 during loading, for providing an attained maximum load indication. That is, as the washer 301 is loaded, the mechanism 350 gears 344, 346, 348 rotate causing shaft 354 and flag 308 to correlatively rotate. As the flag 308 rotates, flag retainer 309 rotates ensuring abutment of extension 321 against load set pointer 370. As the flag 308 comes to rest following loading of washer 301, both the flag 308 and load set pointer 307 indicate an axial loading quantity on scale 312. If the axial loading is later increased, the abutment of extension 321 will cause pointer 307 to move with the movement of flag 308. Contrarily, where the axial loading is lessened or removed, pointer 307 remains fixed at the maximum axial loading experienced by the washer 301.

Thus, when the load indicating flag moves toward zero due to washer unloading, caused by bolt relaxation, deformation, expansion, contraction or the like, such movement from the maximum loading position can be easily detected upon casual visual inspection. To remain fixed against scale 312 after attaining maximum load, end 371 of pointer 307 may be bent over against the top edge of scale 312 providing enough friction to remain in position yet still rotate manually as described below.

Load set pointer 307 of load indicator mechanism 350 may be manually rotated about shaft 354 to serve as a target loading point (e.g. set point) for which to align flag 308 during initial loading or subsequent loading of the washer 301.

To affix load indicating assembly 356 to load indicator mechanism 350, the end of shaft 354 is inserted through bore 370 of outer plate 352, through the square hole of pinion gear 348 and through bore hole 372 of inner plate 302. In addition, boss 313 of scale 312 is pressed into bore hole 370 of outer plate 352. Retaining clip 347 is then inserted into retaining clip groove 358 of shaft 354 to permanently affix load indicator assembly 356 to load indicator mechanism 350.

It should be noted that deflection driver 378 may be removed from bore hole 366 of washer 301, either under load or with no load on washer 301, to check the movement of load indicator mechanism 350. With no load on washer 301, deflection driver 378 may be removed from hole 366, after which flag 308 should rest at the zero load marking on scale 312. By rotating flag 308 from zero to 100% and noting a smooth rotation of the flag 308 and pointer 371 the integrity of the working mechanism 350 may be examined. Upon re-insertion of deflection driver 378 into hole 366 when no axial load is present, flag 308 and pointer 307 returns to zero marking on load scale 312 indicating a no load condition. In addition, deflection driver 378 may be removed from hole 366 in the same manner as above with load on washer 301. In this case, flag 308 and pointer 307 should return to zero marking assuring the integrity of the working mechanism 350. Furthermore, with re-insertion of load driver 378 into hole 366, flag 308 and pointer 307 should return to the previous indicated load on scale 312.

It should also be noted that the length of deflection driver 378 might be chosen such that the end of driver 378 is movably fitted into hole 366. With this construction, main drive gear is put in tacit communication with washer 301, such that the main drive gear 344 rotates as washer 301 dishes under axial loading of the washer 301. The movement of main drive gear 344 drives combination gear 346, which, in turn, drives pinion gear 348. As noted, the movement of pinion gear 348 with its square bore causes shaft 354 to rotate, which, in turn positions pointer 307 and flag 308 along the scale 312 correlative to the amount of axial loading on washer 301.

The meshing of main drive gear 344 with combination gear 346, and combination gear 346 with pinion gear 348 may experience backlash. That is, there may be lost movement (backlash) between the gearing arrangement such that the axial loading indicated on load scale 312 might not be uniform in both directions of rotation. A spring 306 may be used to ensure that the interlocking of the gears 344, 346 and 348 remains snug during movement to minimize the backlash. In particular, spring 306 may be positioned between inner plate 302 and outer plate 352 using suitable fasteners such as pins 338, where pins 338 are fitted in bore holes 398 of inner plate 302 and 396 of outer plate 352, as shown. Spring 306 may further be attached to the end of main drive gear 344 near semi-circular opening 392 such that the elastic energy stored in spring 306 causes main drive gear 344 to exert rotational pressure on combination gear 346, which in turn causes combination gear 346 to exert rotational pressure on pinion gear 348. It should be understood, that in this configuration, the elastic energy stored in spring 306 will be sufficient to force the gears 344, 346, and 348 to rotate to the zero stop setting so as to preload the gearing and inhibit backlash.

It should also be understood that the structure of combination gear 346 may be chosen with respect to the expected dishing in washer 301, such that the gear ratio as measured from the main drive gear 344 to pinion gear 348 is sufficient to ensure ample movement of pointer 310 during operation of the load indicating system 300. For example, as shown, combination gear 346 is depicted having a small gear ratio between main drive gear 344 and combination gear 346, such that a small dishing experienced by washer 301 will translate into a larger rotation of pinion gear 348, since combination gear 346 is constructed with a smaller gear arrangement at gear 346 abutment with main drive gear 346 and a large gear arrangement at the abutment of gear 346 with pinion gear 348. This, in turn, will allow a small dishing of washer 301 to be translated into a measurable axial loading quantity at flag 308. Such gear structures are commonly known. As such, the operation of combination gear 346 will not be discussed herein in detail.

Figure 4A:
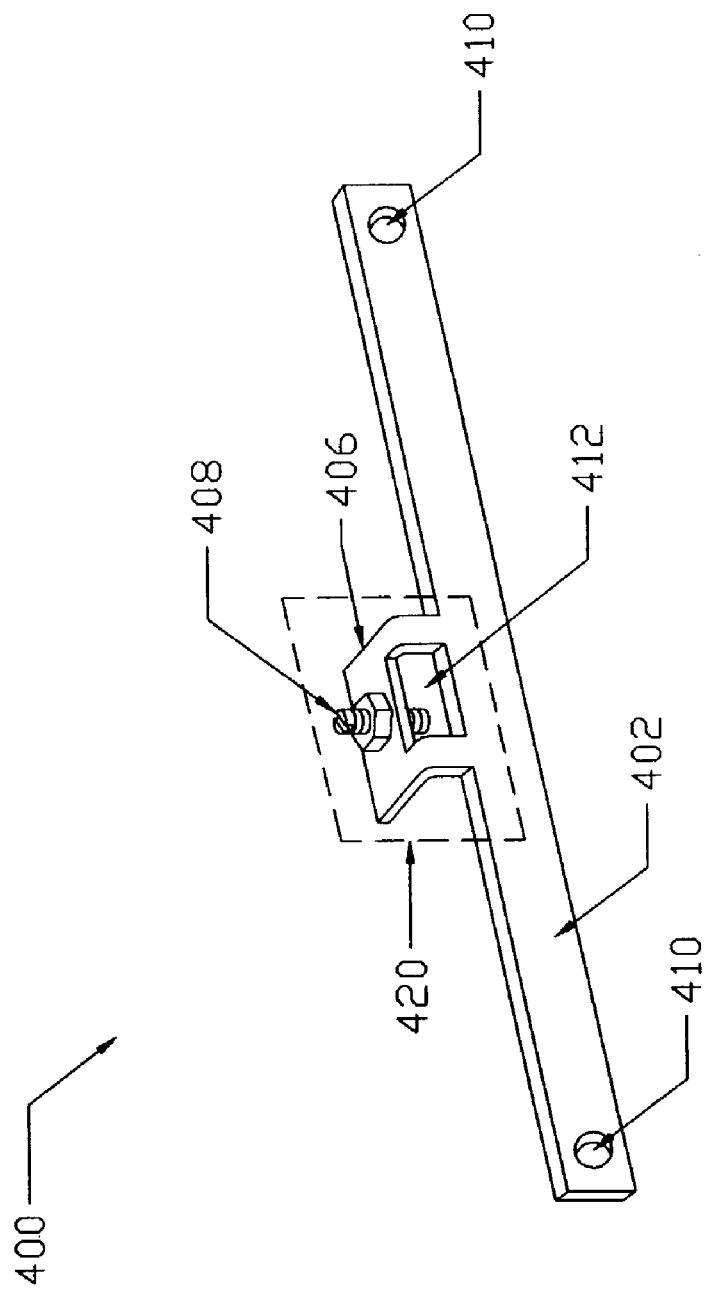
FIG. 4A depicts another exemplary indicator plate in accordance with an exemplary embodiment of the present invention.

FIG. 4A depicts another exemplary embodiment of a load indicating mechanism system 400 in accordance with the present invention. Load indicating system 400 is described with respect to washer 200, although it should be understood that the system 400 may be described with respect to any variation of the washers described herein.

As shown, load indicating mechanism system 400 may include a load indicating plate 402 and a deflection indicator 420. Load indicating plate 402 may further include bore holes 410 at opposing ends of the indicator plate 402 for accepting a fastener for affixing the indicator plate to a washer (not shown). Deflection indicator 420 may be immovably affixed to indicator plate 402, or may be formed as a projection emanating from the indicator plate 402 body as shown. In addition, deflection indicator 420 may comprise an adjustable member, such as, for example, a screw 408 inserted in the deflection indicator 420 such that the screw may be positioned perpendicularly to the surface 204 of a washer in accordance with the present invention. Further, deflection indicator 420 may include an opening 412 suitably configured to allow visual and physical access to the gap between the end of screw 408 and washer surface 204.

Figure 4B:
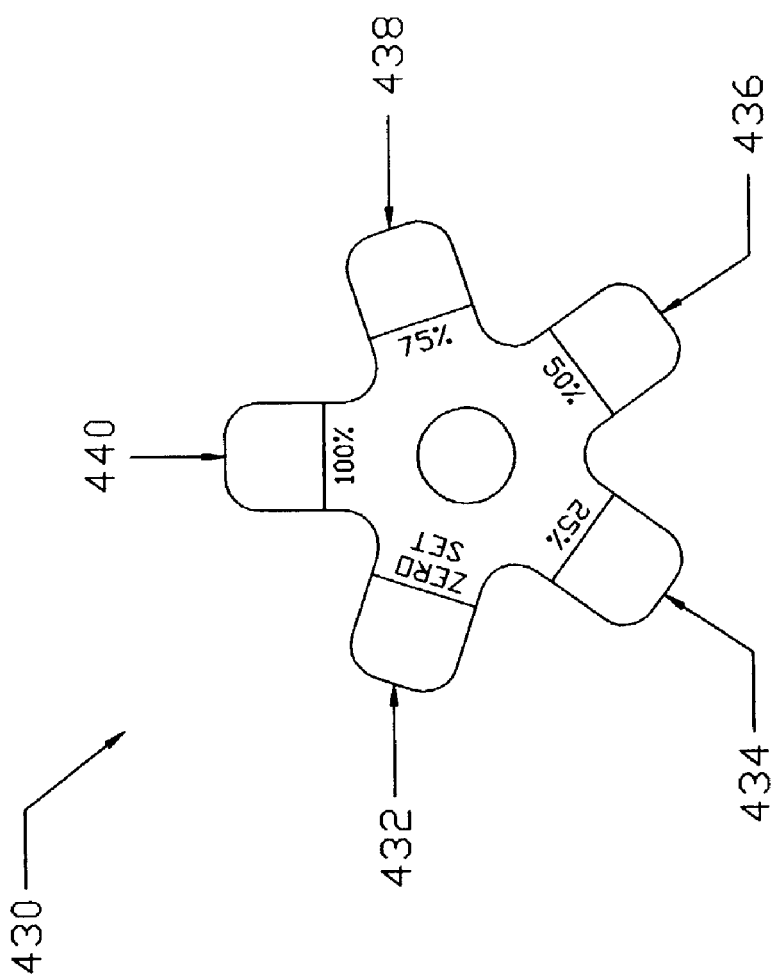
FIG. 4B depicts an exemplary feeler gauge in accordance with an exemplary embodiment of the present invention.

FIG. 4B depicts an exemplary feeler gauge 430 in accordance with the present invention. As shown, feeler gauge 430 may include feeler tabs 432, 434, 436, 438 and 440 of varying thickness, where each level of thickness corresponds to the measure of deflection, e.g., the load, experienced by a washer 200. Further, the width of feeler tabs 432, 434, 436, 438 and 440 are such that each tab may be inserted into opening 412 during operation of the load indicating mechanism system 450 (shown in FIG. 4C). In addition, each feeler tab may be employed to indicate the percentage of deflection experienced by the washer 200, as shown, where 0% indicates that the washer 200 is experiencing no axial loading and 100% indicates that the washer 200 is at its critical effective loading level (e.g., proof load or breaking point or loss of integrity).

It should be understood that while the feeler gauge 430 described in accordance with this invention uses a percent correlation to axial loading as a gauge reading, the invention is not to be so limited. For example, the feeler gauge 430 of the present invention may use load indicating numbers which visually provide the actually loading presently being experienced by the washer load indicating system 450, or any such similar indication of load. In addition, while feeler gauge 430 is depicted with five feeler tabs, it should be understood that the invention is not to be so limited. For example, feeler gauge 430 may include more feeler tabs, such as when it may be necessary to provide axial loading to the washer 200 in more graduated levels for increased resolution and accuracy. For example, in the case where eleven feeler tabs are employed, the feeler tabs may be configured to indicate axial loading of 0%, 10%, 20%, 30%, 40%, 50%, 60%, 70%, 80%, 90% and 100% as required. Conversely, feeler gauge 430 may include less feeler tabs, such as when it may be necessary to determine the axial loading of the feeler tabs at less graduated levels. For example, feeler gauge 430 may include four feeler tabs, where the feeler tabs may be used to indicate an axial loading of 0%, 33%, 66%, and 99%. In this embodiment, 0% may indicate no axial loading of the washer 200, and 99% may indicate that the washer 200 has reached its critical effective loading level (e.g., proof load or breaking point or loss of integrity).

Figure 4C:
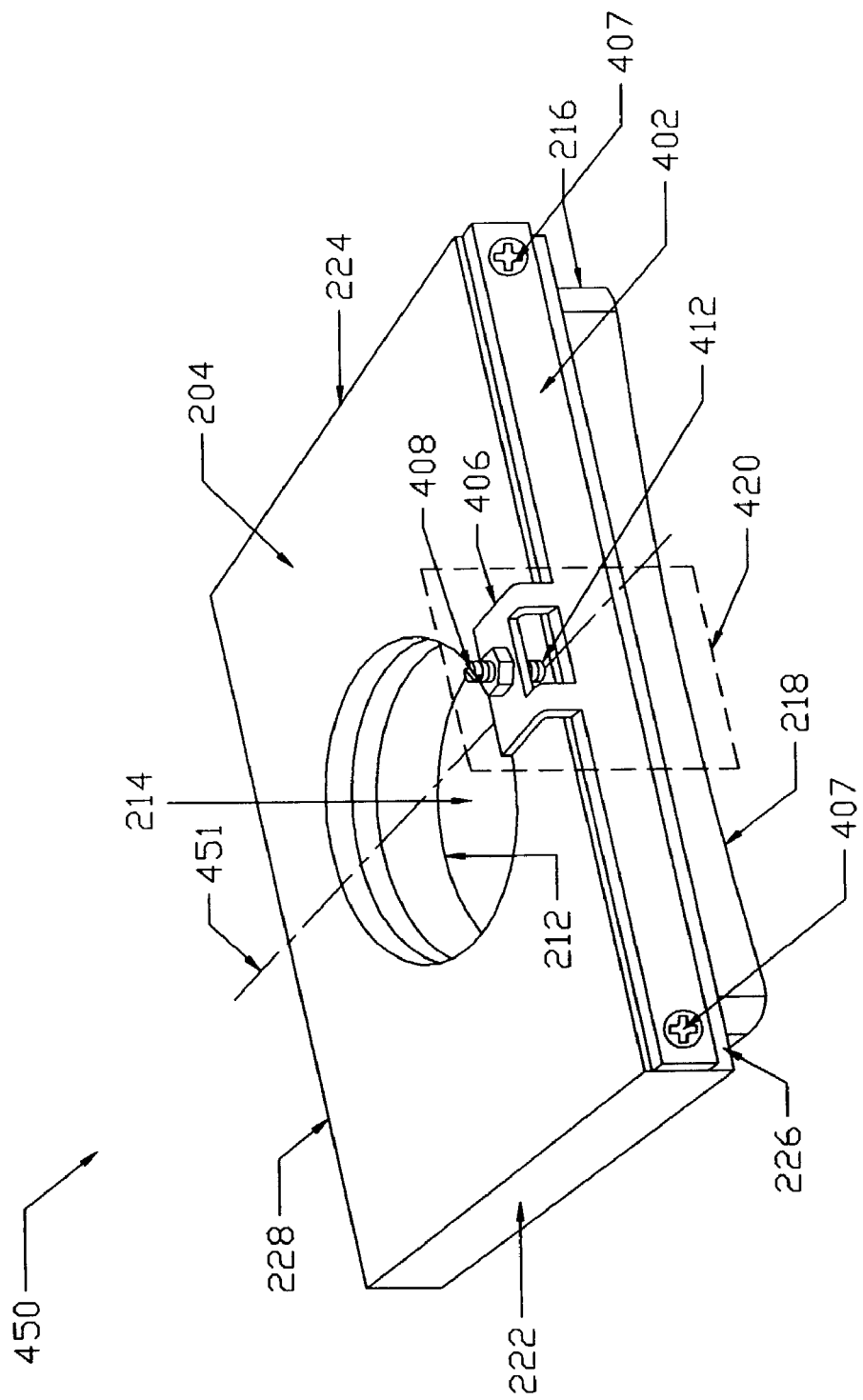
FIG. 4C depicts another exemplary washer and indicator plate in accordance with an exemplary embodiment of the present invention.
Figure 5:
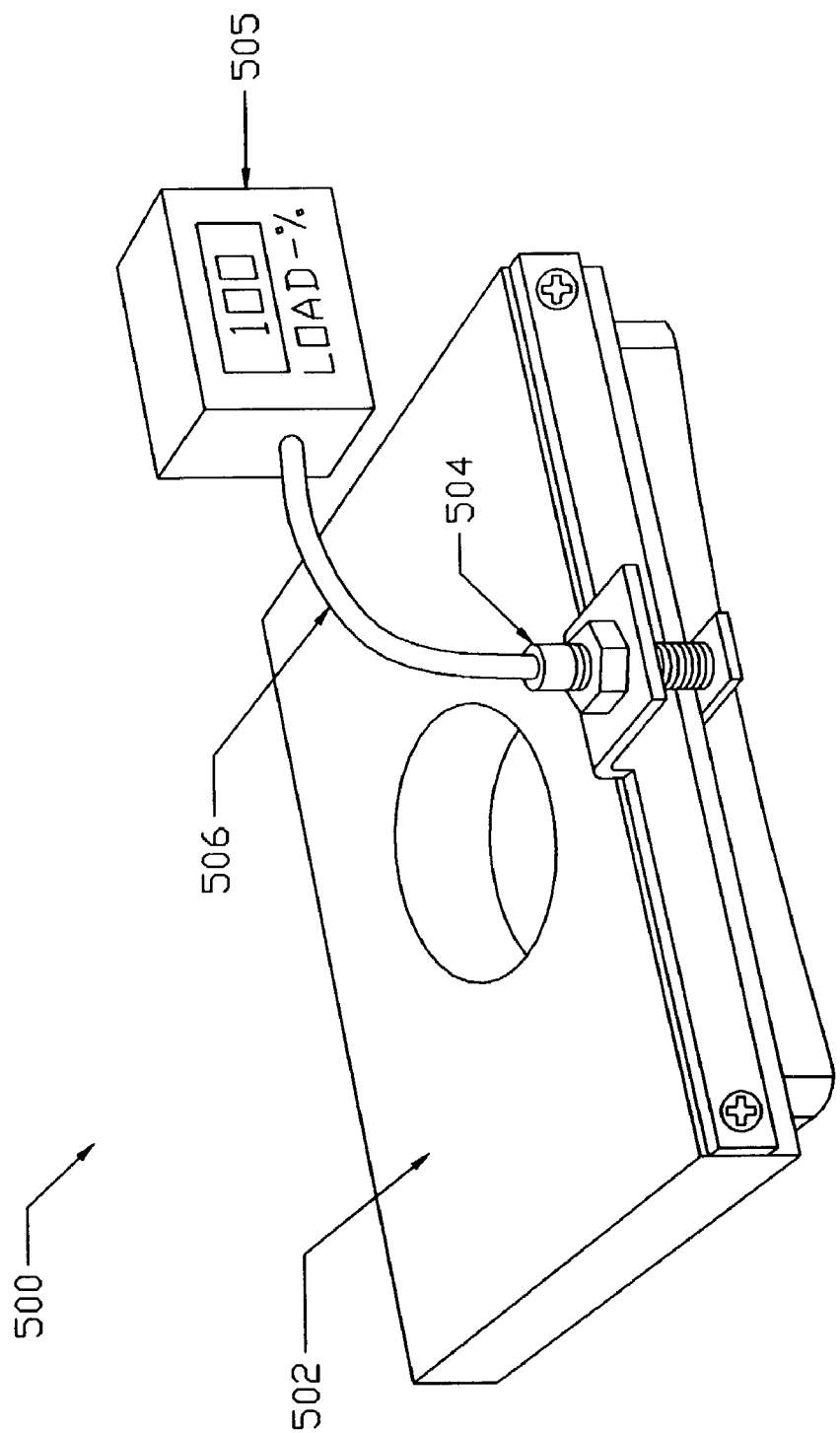
FIG. 5 depicts another exemplary embodiment in accordance with the present invention, wherein a transducer is used to translate an axial load to a readable electrical signal indicating washer load level.

The operation of the load indicating system 450 may be understood fully with reference to FIG. 4C, where the system comprises the load indicating mechanism system 400 shown affixed to a washer 200. As shown, bore holes 410 of the load indicating mechanism system 400 are positioned against bore holes 220 of washer 200 such that suitable fasteners 407 may be employed to immovably affix the indicating mechanism system 400 to the washer 200 front side surface 226. It should be understood that indicator plate indicating mechanism system 400 may be attached to the suitable washer 200 using any such fastening method capable of holding the indicator plate 402 immobile with respect to the washer 200 front side surface 226.

Indicator mechanism system 400 is affixed such that the adjustable member 408 is positioned along the centerline 451 of the washer top surface 204. That is, adjustable member 408 is positioned such that it is substantially equidistant between the left side surface 222 and right side surface 224. For calibration and checking zero, prior to applying in-service axial loading to the load indicating system 450, feeler tab 432 of feeler gauge 430 may be placed into opening 412, and more particularly, under the bottom portion of adjustable screw 408 and onto the surface of washer 200. The adjustable member 408 may then be adjusted so that it comes to rest on top of feeler tab 432, which, in turn, allows calibration of the load indicating system 400 at zero load condition. In this position, a measurable gap is created between the adjustable member 408 and the washer upper surface 204 and the deflection indicator 420 is calibrated when the feeler tab 432 fits snugly when inserted into the measurable gap as described above. This provides a zero reference point thereby indicating, for example, that the washer 200 is experiencing 0% load.

As in-service axial load is applied to, or removed from the load indicating system 450, the washer 200 experiences a deflection correlative to the amount of loading on the system. This deflection, in turn, causes the washer 200 to store elastic energy and further causes the measurable gap to increase or decrease in accordance with the amount of axial load. The amount of desired in-service axial loading, or preload, can then be accurately set using feeler tabs 434, 436, 438, 440 in similar manner as was described above with respect to feeler tab 432. More particularly, the axial load may then be set to a desired load as measured by the feeler tabs of feeler gauge 430. For example, where a 50% preload condition is desired during assembly, the axial load may be increased on the washer until feeler tab 436 fits snugly into opening 412 such that adjustable screw 408 rest on the surface of the feeler tab 436, and the feeler tab 436 rests on the washer 200 upper surface 204. In addition, it should be noted that under this configuration, a desired in-service load of 100% may be set by increasing the load and inserting feeler tab 440 in like manner as was done with respect to feeler tab 436. In this case, feeler tab 440 may represent the critical effective loading level of the washer. In the alternative, 100% load may represent any load desired by the system user.

It should be noted that the previous paragraph describes setting the desired in-service preload on load indicating washer 450. To measure the load on a previously loaded washer using load indicating system 450, the tabs of feeler gage 430 may be used as "go/no-go" gages. That is, for example, with feeler gage tab 436 fitting loosely in opening 412 and feeler gage 438 not fitting at all in opening 412, an in-service load between 50% and 75% would be indicated. It should also be reiterated, as previously noted, that the resolution and accuracy of load indicating system 450 may be increased by using a feeler gage with more tabs, such as the gage previously described with 11 tabs, or a combination of feeler gages to further increase the accuracy and resolution. For example, tab 434 indicating 25% load may be used in combination with a tab indicating a 10% load to measure a combined load of 35%.

In yet another exemplary embodiment of the present invention, a load indicator system 500 may incorporate a transducer 504 capable of detecting the deflection of a washer 502 may be used. A suitable transducer for use with the is embodiment may be a LVDT or SPC4 displacement transducer, or the like, as is commonly known. As shown, load indicating system 500 may be of similar construction and operation as washer system 400 described with respect to FIGS. 4A–4C. Instead of utilizing an adjustable screw 508 or feeler gauge, however, system 500 uses a deflection transducer capable of converting the washer 502 deflection into a signal readable by an externally situated visually friendly component. For example, the component may be a display device capable of translating the signal from the transducer into a quantity discernable through visual inspection, where the quantity is a representation of washer dishing and/or axial loading. For example, the washer 502 deflection may converted into an electrical signal representative of the total deflection experienced by the system 500, and or the percent deflection relative to some known quantity (e.g., washer break point). An electrical component, such as a display device 505 may receive the signal through a cable 506, wherein the signal may be converted to an electrical output correlative to the loading experienced by the system 500, which is readable by the system 500 user. It should be noted, that while system 500 is described with respect to an electrical output, the invention is not to be so limited. For example, the transducer 504 may convert the detected deflection into a signal which may be sent to any suitable output device for displaying the deflection in a form readable by the system 500 user. In that regard, component 505 may be mechanical. Further, component 505 may be removable from cable 506, such that the component 505 may be employed (e.g., reattached to cable 506) when examining the load condition of the washer 502.

Figure 6A:
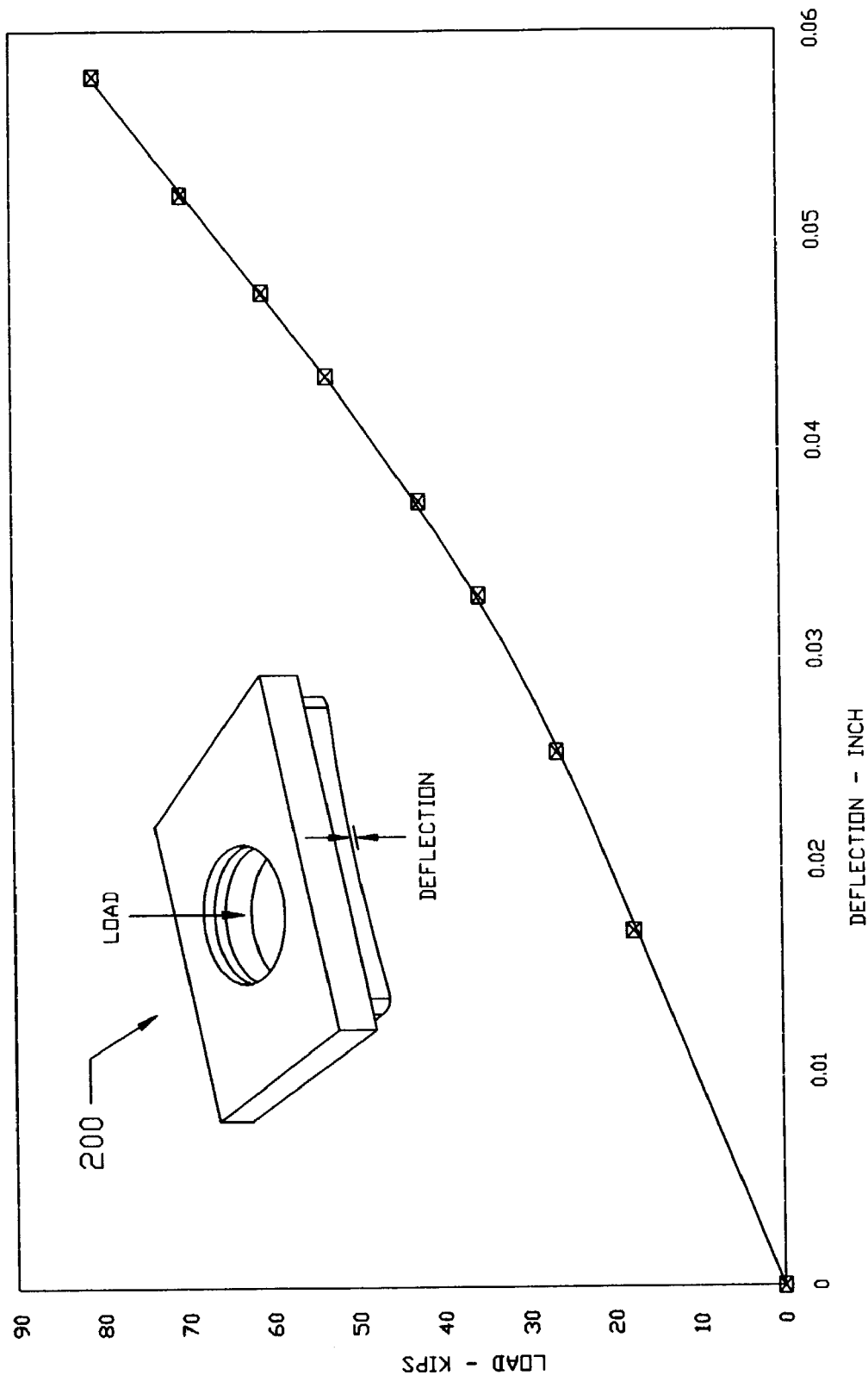
FIG. 6A shows an exemplary load/deflection relationship of an exemplary washer in accordance with an exemplary embodiment of the present invention.

As noted, the spherical bottom portion 118 and 218 of washer 100 and 200, respectively, deflects proportionately to the applied load, which in turn, causes the upper surface of the washer 100 and 200 to deflect correlatively and further causes the washer to store elastic energy. Given the proportionality between the deflection and the applied load, the dimensional features of the washer (thickness and radius of the bottom surface 118 and 218) may be controlled so that at a certain deflection of the spherical surface 118 and 218, a desired load condition can be achieved increasing the viability of a fastener arrangement. In one particular embodiment, the washer 200 may be designed so that the maximum load, e.g., 100% load, represents the proof load of the fastener used to apply the axial load to the washer 200. For example, with reference to FIG. 6A, what is shown is an exemplary load-deflection relationship of a typical joint using a 4 inch by 5 inch washer 200 with a 80,000 lbs. capacity and a 1½ inch bolt at a 4 inch grip length. Where a 4-inch by 5-inch washer 200 has a load capacity of 80,000 lbs., the spherical surface 218 may typically be configured such that a deflection of 0.060 inches is measured in the washer 200 at 80,000 lbs. This elastic energy given to the washer deflection may be added to the elastic energy stored in the typical joint arrangement not using such a washer 200, which may ordinarily experience a deflection of 0.006 inches. In this case, when the deflection of washer 200 is added to the ordinary deflection of the joint, the joint will experience a total deflection of 0.066 inches, since the energy given to the deflection of the washer 200 may now be added to the elastic energy stored in the bolt. In this case, a 1000% increase in stored elastic energy is evident, which increases the viability of the joint. That is, the joint becomes 10 times more tolerant to in-service loosing or failure.

Figure 6B:
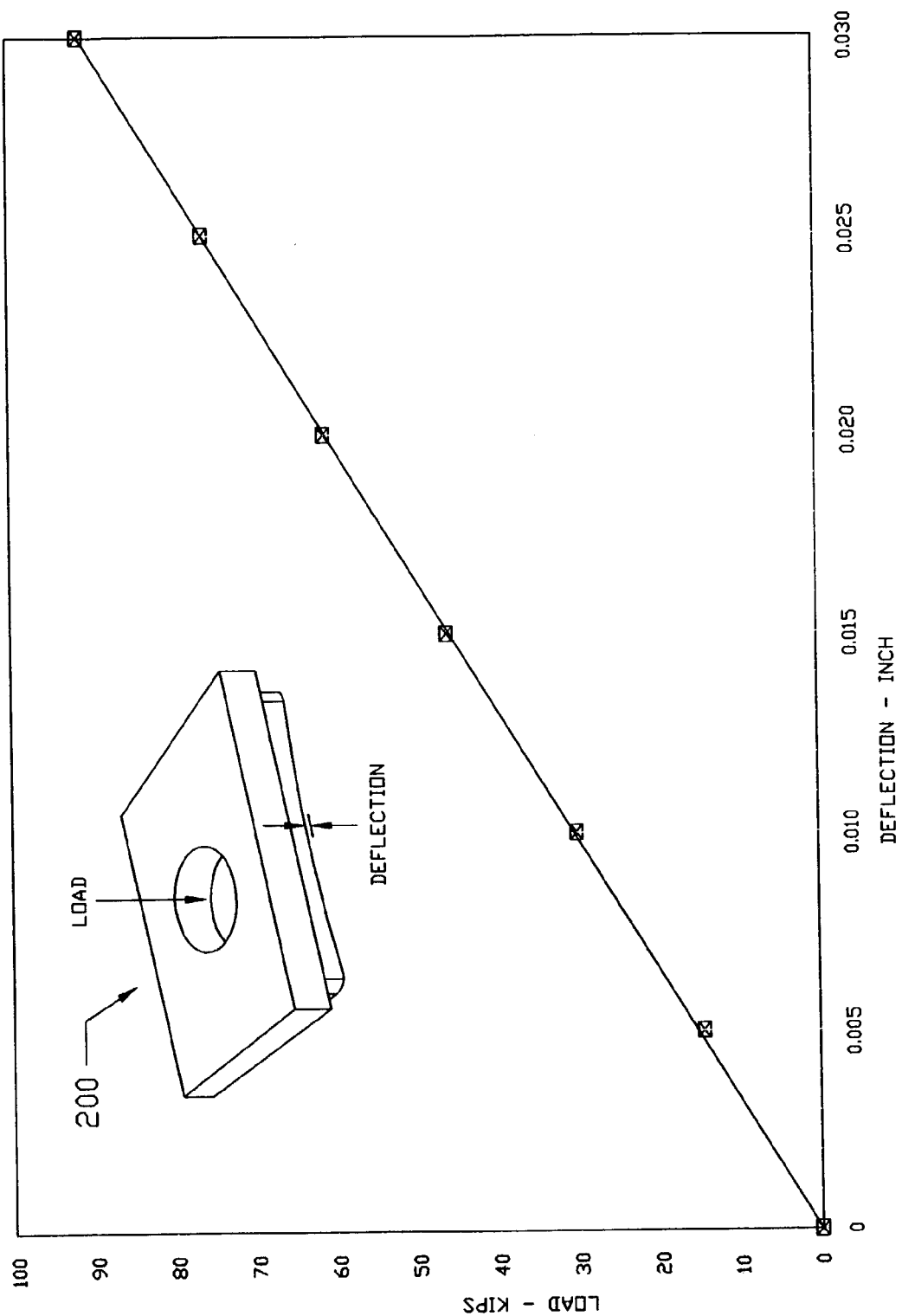
FIG. 6B shows another exemplary load/deflection relationship of an exemplary washer in accordance with an exemplary embodiment of the present invention.

In FIG. 6B, what is shown is an exemplary load-deflection relationship of a typical joint using a 5 inch by 5.7 inch washer 200 with a 90,000 lbs. capacity and a 1½ inch bolt at a 4 inch grip length. Where a 5-inch by 5.7-inch washer 200 has a load capacity of 90,000 lbs., the spherical surface 218 may typically be configured such that a deflection of 0.030" is measured in the washer 200 at 90,000 lbs. This elastic energy given to the washer 200 deflection may be added to the elastic energy stored in the typical joint arrangement not using such a washer 200, which may ordinarily experience a deflection of 0.007 inches. In this case, when the deflection of washer 200 is added to the ordinary deflection of the joint, the joint will experience a total deflection of 0.037 inches, since the energy given to the deflection of the washer 200 may now be added to the elastic energy stored in the bolt. In this case, a 430% increase in stored elastic energy is evident, which increases the viability of the join. That is, the joint becomes 5.3 times more tolerant to in-service loosing or failure.

The present invention has been described above with reference to various exemplary embodiments. However, those skilled in the art will recognize that changes and modifications may be made to the exemplary embodiments without departing from the scope of the present invention. For example, central bore of the washers described above may be configured to accommodate any apparatus for fastening or sealing. That is, where a rectangular seal is to be inserted into the central bore location, the washer recess may be configured to accommodate such rectangular seal. Similarly, where a circular seal is to be used with respect to the bottom surface of the washer the bottom surface may be configured such that the circular seal may be inserted around the perimeter of the bottom surface. In the alternative, the washer may be configured such that only one seal or no seals are use. Further, the washer bottom may be formed with or without the use of serrations as required. Further still, while the present invention has been described with respect to fasteners such as an adjustable screw, it should be understood that any suitable adjustable member performing the function of the adjustable screw may be used and are well known in the fastener art. Consequently, such adjustable members are not to be discussed herein for brevity. Further, while the invention has been described with respect to fasteners, it should be understood that any such member capable of performing a fastening function as variously described herein might be used.

I claim:

1. A load indicating system for use with a fastener experiencing loading, comprising:
    a fastener insert configured to be loaded by said fastener, said insert including an arched surface substantially perpendicular to said loading, said arched surface for deflecting when said insert is loaded, said deflecting relative to said loading; and
    a load indicator mechanism affixed to said insert, said load indicator mechanism for translating said deflecting into a visually discernable quantity representing the amount of loading experienced by said load indicating system, wherein said load indicator mechanism comprises a load indicator assembly for displaying said visually discernable quantity to a system user, said load indicator assembly including, a load indicating scale for displaying at least one load indicator marking representative of a value of system loading, and a load indicator pointer for pointing to said marking when said insert is loaded.

2. A system according to claim 1, wherein said load indicator mechanism comprises a load set pointer for indicating at least one of an initial loading condition, a real-time loading condition and a maximum loading condition of said insert, said maximum loading condition being indicated irrespective of said real-time loading condition.

3. A system according to claim 1, wherein said load indicator mechanism comprises a zeroing mechanism for calibrating said load indicator mechanism , said zeroing mechanism for ensuring that said load indicator pointer indicates a zero load.

4. A system according to claim 1, wherein said load indicator mechanism comprises a full-scale adjustment mechanism for calibrating said load indicator mechanism, said full scale adjustment mechanism for ensuring that said load indicator points to a maximum load marking relative to a maximum target load.

5. A system according to claim 1, wherein said insert further includes means for minimizing movement of said insert during loading.

6. A system according to claim 1, wherein at least one of said insert dimensions and composition is chosen in accordance with fastener requirements.

7. A system according to claim 1, wherein said fastener insert stores elastic energy when loaded.

8. A load indicating system for use with a fastener experiencing axial loading comprising:
    a fastener insert for including in a fastener joint, said fastener insert comprising:
    an upper insert surface;
    a front insert surface;
    a rear insert surface;
    an arched bottom insert surface extending from said front insert surface to said rear insert surface, said arched bottom insert surface positioned to provide for insert deflection during loading; and a load indicator mechanism including first and second opposing ends, a load indicator assembly, said load indicator assembly including a load indicating scale positioned between said first and second opposing ends, said load indicating scale comprising visible indications of insert load level; said load indicating scale characterized by an indicating scale central axis, said load indicator assembly further including a load indicator pointer rotatably attached along said indicating scale central axis, said indicating pointer for pointing to said visual indications of insert levels in accordance with said insert deflection during axial loading, said load indicator mechanism further including a rotatable pinion drive gear attached to said indicator pointer, at least a middle drive gear meshed with said pinion gear, said middle drive gear positioned to rotate against said pinion drive gear causing said pinion drive gear to rotate, and a main drive gear responsive to said deflection, said main drive gear meshed with said middle drive gear for causing said middle drive gear to rotate.

9. A system according to claim 8, further comprising a retention spring, for ensuring continuous abutment of said main drive gear with said middle drive gear.

* * * * *